(12) United States Patent
Woolery

(10) Patent No.: US 11,326,923 B2
(45) Date of Patent: May 10, 2022

(54) TAMPER-RESISTANT LID ASSEMBLY FOR DISPENSING A PREMEASURED AMOUNT OF LIQUID

(71) Applicant: Verdant Ventures, Cincinnati, OH (US)

(72) Inventor: Benjamin Woolery, Loveland, OH (US)

(73) Assignee: Verdant Ventures, Cincinnati, OH (US)

( * ) Notice: Subject to any disclaimer, the term of this patent is extended or adjusted under 35 U.S.C. 154(b) by 456 days.

(21) Appl. No.: 16/596,099

(22) Filed: Oct. 8, 2019

(65) Prior Publication Data
US 2021/0102829 A1 Apr. 8, 2021

(51) Int. Cl.
*G01F 19/00* (2006.01)
*B65D 43/02* (2006.01)
*B65D 51/28* (2006.01)

(52) U.S. Cl.
CPC ......... *G01F 19/00* (2013.01); *B65D 43/0256* (2013.01); *B65D 51/28* (2013.01)

(58) Field of Classification Search
CPC ................................ G01F 19/00; B65D 51/28
See application file for complete search history.

(56) References Cited

U.S. PATENT DOCUMENTS

| | | | |
|---|---|---|---|
| 2,052,551 A | 9/1936 | Browne | |
| 3,450,290 A * | 6/1969 | Turner | B65D 50/062 215/206 |
| 3,779,412 A * | 12/1973 | Kirton | B65D 50/041 215/221 |
| D270,521 S | 9/1983 | Morris | |
| 4,512,485 A * | 4/1985 | Agbay | B65D 50/062 220/221 |
| D279,267 S | 6/1985 | Morris | |
| D304,424 S | 11/1989 | Dawson | |
| D305,735 S | 1/1990 | Zinnbauer | |
| D311,140 S | 10/1990 | Nelson | |
| D312,044 S | 11/1990 | Davis | |
| D318,804 S | 8/1991 | Ochs | |
| 5,224,615 A | 7/1993 | Hickerson | |
| D350,068 S | 8/1994 | Schwartzburg | |
| D359,903 S | 7/1995 | Arshinoff et al. | |
| D362,185 S | 9/1995 | Ramsey | |
| D365,519 S | 12/1995 | Welch et al. | |
| D370,845 S | 6/1996 | Sherman et al. | |
| D377,758 S | 2/1997 | Valley | |

(Continued)

FOREIGN PATENT DOCUMENTS

AU 41044 8/1976
BR PI1104537 A2 8/2013

(Continued)

*Primary Examiner* — Jamel E Williams
(74) *Attorney, Agent, or Firm* — Dinsmore & Shohl LLP

(57) ABSTRACT

A tamper-resistant lid assembly for dispensing a premeasured amount of liquid from a beverage container and a method of providing a tamper-resistant lid assembly for use in dispensing a premeasured amount of liquid. The assembly includes a cup and a ring that are secured to one another using a snap-fit connection, as well as a lockable connection enabled by a selectively twistable rotation of the cup and the ring once the snap-fit connection is established.

17 Claims, 12 Drawing Sheets

(56) References Cited

U.S. PATENT DOCUMENTS

| | | | |
|---|---|---|---|
| 5,632,393 A * | 5/1997 | Houser | B65D 83/40 |
| | | | 220/915 |
| 5,727,704 A * | 3/1998 | Glynn | B65D 50/04 |
| | | | 215/221 |
| D397,031 S | 8/1998 | Fricke | |
| D398,241 S | 9/1998 | Krebs | |
| D399,743 S | 10/1998 | Coon et al. | |
| D404,303 S | 1/1999 | Webster | |
| D405,371 S | 2/1999 | Herr | |
| D419,447 S | 1/2000 | Molloy | |
| D421,909 S | 3/2000 | Opresco | |
| D427,528 S | 7/2000 | Krueger | |
| D431,864 S | 10/2000 | Jansen | |
| D462,269 S | 9/2002 | Hunter et al. | |
| D476,563 S | 7/2003 | Brozell et al. | |
| D481,948 S | 11/2003 | Brozell et al. | |
| D495,256 S | 8/2004 | Solowiejko | |
| D508,203 S | 8/2005 | Ziegenhorn et al. | |
| D508,204 S | 8/2005 | Pitman et al. | |
| D508,402 S | 8/2005 | Hierzer et al. | |
| D508,853 S | 8/2005 | Ziegenhorn et al. | |
| D561,587 S | 2/2008 | Lin | |
| D599,203 S | 9/2009 | Wilson et al. | |
| D604,161 S | 11/2009 | Wilson et al. | |
| D607,326 S | 1/2010 | Branson et al. | |
| D617,188 S | 6/2010 | Sturk | |
| D642,918 S | 8/2011 | Taylor | |
| D642,919 S | 8/2011 | Taylor | |
| D646,971 S | 10/2011 | Chmela | |
| D681,464 S | 5/2013 | Taylor | |
| 8,453,873 B2 | 6/2013 | Zielinski et al. | |
| D687,709 S | 8/2013 | Taylor | |
| D711,225 S | 8/2014 | Lund | |
| 8,863,947 B2 | 10/2014 | Sibley | |
| D727,726 S | 4/2015 | Friedman | |
| D732,975 S | 6/2015 | Hua | |
| 9,504,341 B2 | 11/2016 | Suprina | |
| D781,705 S | 3/2017 | Hewitt | |
| 9,718,590 B2 | 8/2017 | Dejonge | |
| D800,276 S | 10/2017 | Taylor et al. | |
| 9,878,821 B2 * | 1/2018 | Sibley | B65B 29/00 |
| 10,011,405 B2 * | 7/2018 | DeJonge | B65D 50/062 |
| D826,066 S | 8/2018 | Creighton | |
| D841,153 S | 2/2019 | Kokubo | |
| D847,628 S | 5/2019 | Ludewig | |
| 10,597,207 B2 * | 3/2020 | Seelhofer | B65D 51/2821 |
| 2006/0213912 A1 * | 9/2006 | Zaytoun | B65D 41/06 |
| | | | 220/717 |
| 2017/0355495 A1 * | 12/2017 | Martin | B65D 53/06 |

FOREIGN PATENT DOCUMENTS

| | | |
|---|---|---|
| CA | 179904 A | 2/1917 |
| CD | 62018 | 11/1988 |
| CD | 173662 | 2/2018 |
| CD | 172774 | 6/2018 |
| CD | 130740 | 2/2020 |
| FR | 893537-005 | 5/1989 |
| GB | 2048852 A | 12/1980 |
| GB | 2054356 A | 2/1981 |
| GB | 2102707 A | 2/1983 |
| GB | 2103514 A | 2/1983 |
| GB | 4042698 | 8/2015 |
| IN | 222882 A1 | 8/2008 |
| IN | 222883 A1 | 8/2008 |
| IN | 223480 A1 | 11/2008 |
| IN | 269655 A1 | 10/2015 |
| IN | 270188 A1 | 11/2015 |
| IN | 290374 A1 | 12/2017 |
| IN | 293459 A1 | 3/2018 |
| IN | 299515 A1 | 8/2018 |
| IN | 302687 A1 | 11/2018 |
| JP | 1602283 | 1/2017 |
| MY | 99-00016-0101 | 9/1999 |
| NZ | 19274 | 7/1984 |
| NZ | 21330 | 7/1987 |
| NZ | 24730 | 9/1992 |
| NZ | 25273 | 6/1993 |
| NZ | 26693 | 5/1995 |
| NZ | 27410 | 2/1996 |
| NZ | 27648 | 6/1996 |
| NZ | 28397 | 4/1997 |
| NZ | 28848 | 9/1997 |
| NZ | 29292 | 7/1998 |
| NZ | 29491 | 7/1998 |
| NZ | 29509 | 7/1998 |
| NZ | 29559 | 8/1998 |
| NZ | 29560 | 8/1998 |
| NZ | 30567 | 9/1999 |
| NZ | 403308 | 2/2003 |
| NZ | 403950 | 9/2003 |
| NZ | 406088 | 4/2005 |
| NZ | 407717 | 6/2006 |
| NZ | 419611 | 12/2014 |
| NZ | 422630 | 1/2017 |
| NZ | 423341 | 8/2017 |
| NZ | 423342 | 8/2017 |
| PH | 700000000005759-1 | 4/1992 |
| PH | 700000000007017-1 | 3/1995 |
| PH | 700000000007657-1 | 10/1995 |
| PH | 702002000000671-1 | 11/2002 |
| PH | 702003000000824-1 | 2/2003 |
| PH | 702004000000806-1 | 11/2004 |
| PH | 702005000001231-1 | 12/2005 |
| PH | 702007000000866 | 12/2007 |
| PH | 702009000000051-1 | 2/2009 |
| PH | 702009000000358-1 | 6/2009 |
| PH | 702009000000746-1 | 12/2009 |
| PH | 702011000000621-1 | 7/2011 |
| PH | 702012000001218-1 | 12/2012 |
| PH | 702012000001219-1 | 12/2012 |
| PH | 702013000000549-1 | 5/2013 |
| PH | 3-2018-50009 | 1/2018 |
| SE | 1056080 | 1/1989 |
| WO | 9204249 A1 | 3/1992 |
| WO | 9916678 A1 | 4/1999 |

* cited by examiner

TAMPER-RESISTANT LID ASSEMBLY FOR DISPENSING A PREMEASURED AMOUNT OF LIQUID

TECHNICAL FIELD

The present disclosure generally relates to a selectively removable yet tamper-resistant lid for canned beverages, and more particularly to such a lid that engages with a beverage can such that the lid may act as a drinking cup that meters out a particular amount of a liquid to the beverage contained within the can.

BACKGROUND

The author of the present disclosure has determined that there is a need for an assembly made from a ring and a cup that together can be removably placed on the dispensing end of a beverage container. The author of the present disclosure has further determined that there is a need for such an assembly where upon removal of the cup, it may be used to selectively receiving a measured amount of the beverage from the container. The author of the present disclosure has further determined that there is a need for the ring and cup of such an assembly to be selectively disengagable from one another through a lockable connection. The author of the present disclosure has additionally determined that there is a need for a tamper-resistant lid assembly that can permit nested stacking with another beverage container.

BRIEF SUMMARY

According to an aspect of the present disclosure, a tamper-resistant lid assembly for dispensing a premeasured amount of liquid from a beverage container is disclosed. According to another aspect of the present disclosure, a method of providing a tamper-resistant lid assembly for use in dispensing a premeasured amount of liquid is disclosed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
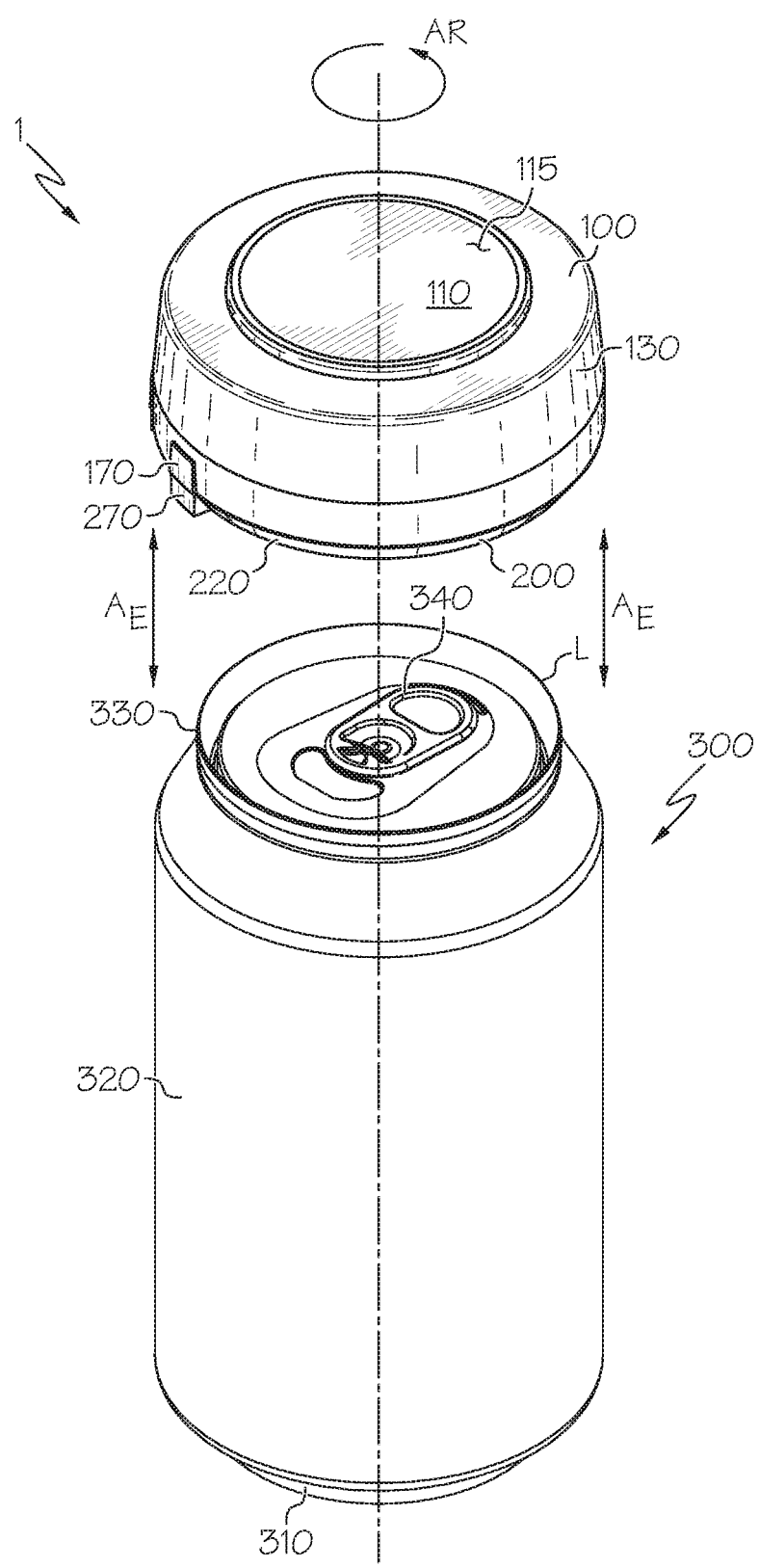
FIG. 1 depicts an upper perspective view of a tamper-resistant lid assembly for dispensing a premeasured amount of liquid according to a first embodiment of the present disclosure, the tamper-resistant lid assembly presently shown in an assembled state between a cup and a ring.
Figure 2:
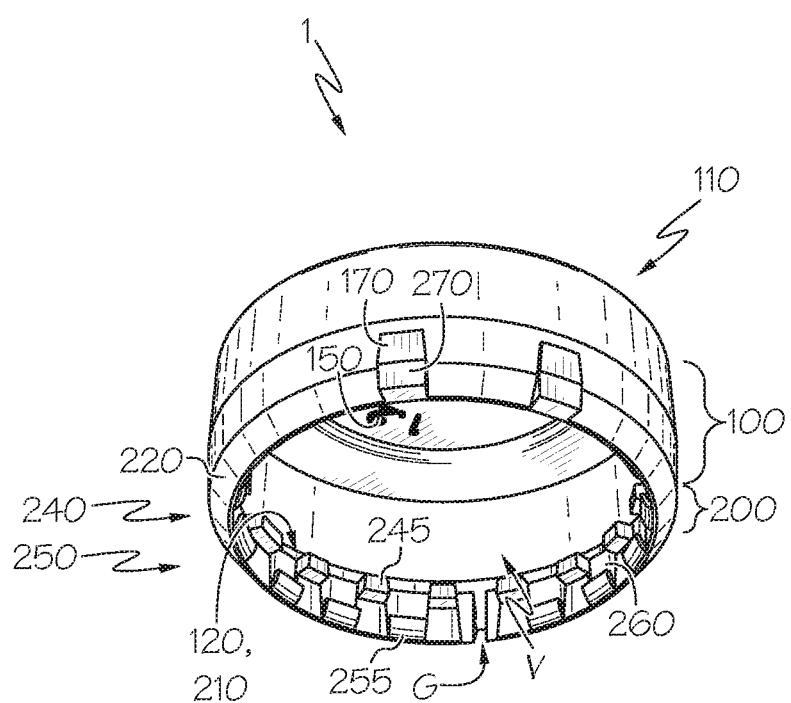
FIG. 2 is a lower perspective view of the tamper-resistant lid assembly of FIG. 1.
Figure 3:
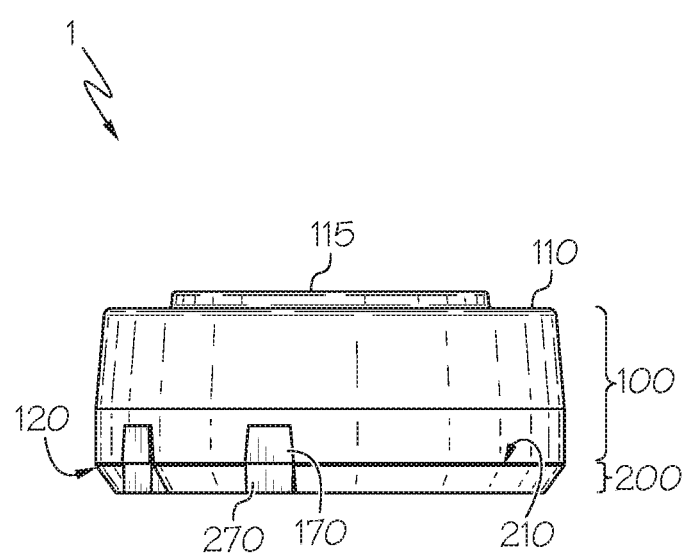
FIG. 3 is a first elevation view of the tamper-resistant lid assembly of FIG. 1.
Figure 4:
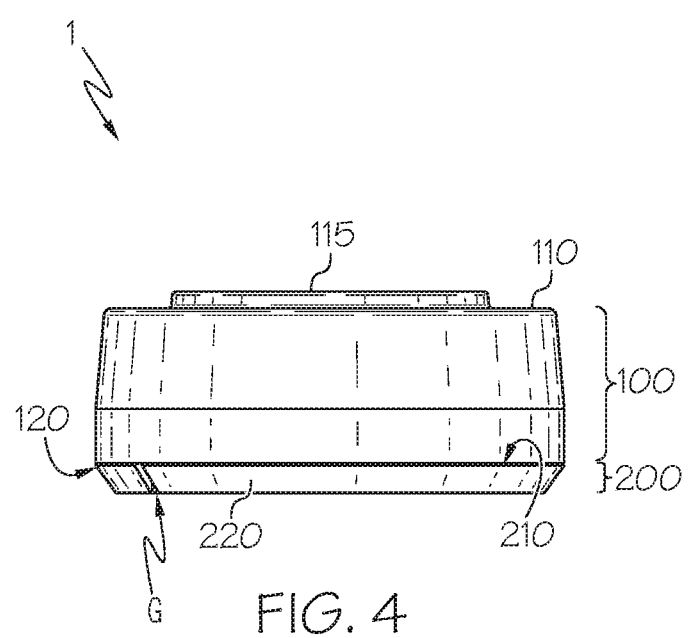
FIG. 4 is a second elevation view of the tamper-resistant lid assembly of FIG. 1.
Figure 5:
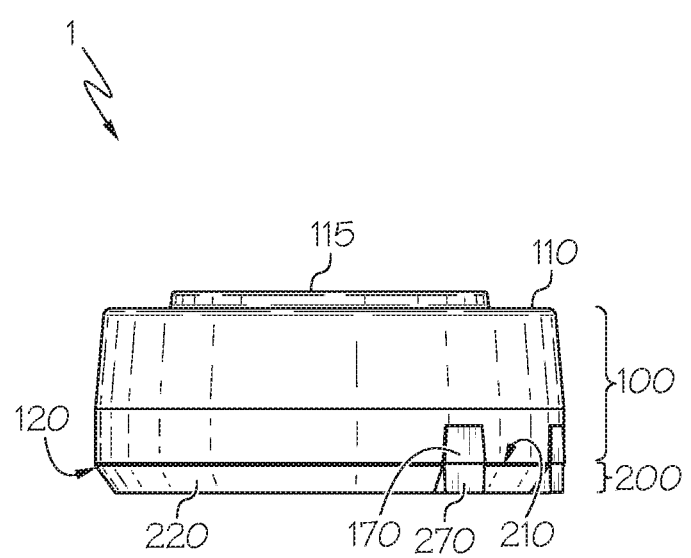
FIG. 5 is a third elevation view of the tamper-resistant lid assembly of FIG. 1.
Figure 6:
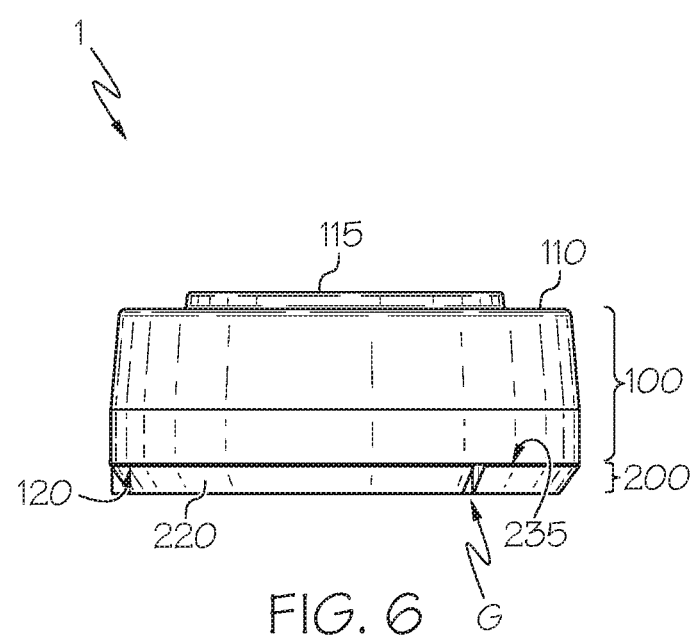
FIG. 6 is a fourth elevation view of the tamper-resistant lid assembly of FIG. 1.
Figure 7:
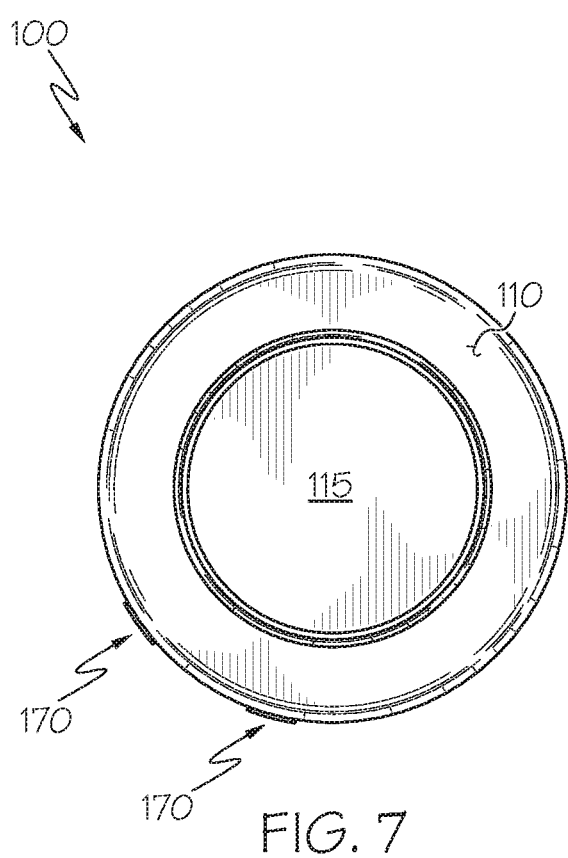
FIG. 7 is a top view of the tamper-resistant lid assembly of FIG. 1.

Referring first to FIGS. 1 through 8 and 12, the tamper-resistant lid assembly 1 includes a cup 100 and a ring 200. The cup 100 is sized and shaped to receive a premeasured amount of liquid such as that which is contained within—and capable of being dispensed from—a beverage container 300. In one form, the beverage container 300 defines a generally axisymmetric profile about an axis of rotation $A_R$, and is made from a conventional material such as aluminum and formed from two pieces where one piece made up of a bottom section 310 and body section 320 are initially drawn or otherwise formed from a piece of generally planar aluminum stock. Once the beverage (typically either 12 ounces or 16 ounces in the United States) is placed within the volume defined by the bottom section 310 and the body section 320, a dispensing end or section 330 is sealed onto an unformed edge that circumscribes the upper edge of the body section 320. A sealing compound (not shown) may be added in order to promote fluid and air tightness. The dispensing section 330 is typically crimped onto the body section 320 in a two-step operation where the edge of the dispensing section 330 is curled around the peripheral edge of the body section 320 followed by a pressure roller to make a fluid-tight and gas-tight seal. A lip L forms a rimmed edge that circumscribes the dispensing section 330. A stay-on tab 340 is typically formed on the generally planar upper surface of the dispensing section 330 such that upon opening, a beverage or other fluid contained within the beverage container 300 may be dispensed. The cooperation or interaction of the tamper-resistant lid assembly 1 and the beverage container 300 is such that upon the application of an axially compressive force along the elongate axis $A_E$, one or both of the ring 200 alone or the entirety of the tamper-resistant lid assembly 1 may be snap-fit onto the beverage container 300.

It will be appreciated that the details associated with the beverage container 300 depicted in FIG. 1 are for visualization purposes only; as such, other shapes, sizes and configurations of such beverage container 300 are deemed to be within the scope of the present disclosure so long as the portions thereof that interact with the tamper-resistant lid assembly 1 are of comparable size, shape and configuration to enable such interaction. Relatedly, it will be appreciated that the volumetric capacity and design or construction of the beverage container 300 is merely mentioned as an example, and that other sizes, depending on the packaging needs for the fluid be contained therein, may be formed all such sizes and construction types of which are deemed to be within the scope of the present disclosure. Moreover, although the beverage container 300 as disclosed herein is mentioned in conjunction consumable beverages such as water, soda, tea, beer or the like, it will be appreciated that other fluids, such as those associated with industrial or other uses where the dispensing of predetermined amount of the fluid is desired, may be contained within a similarly-configured container, and that the irrespective of such fluid, the tamper-resistant lid assembly 1 may be used in conjunction with such containers in such a way that it is within the scope of the present disclosure. In addition, while in one form the interaction of the tamper-resistant lid assembly 1 and the beverage container 300 as depicted in FIG. 1 shows the entirety of the tamper-resistant lid assembly 1 being connected to the beverage container 300, it will be appreciated from FIG. 12 that in another form that the ring 200 alone (that is to say, without the cup 100) may be similarly attached to the beverage container 300 and that both variants are deemed to be within the scope of the present disclosure.

As can be seen, the tamper-resistant lid assembly 1 provides a way to be secured to the beverage container 300 once the beverage container 300 is opened. Because the tamper-resistant lid assembly 1 is not inherently liquid-tight or spill proof, in one form, a thin seal (not shown) may be applied to one or both of the ring 200 and the cup 100 in order to enhance liquid-tightness and related spill-proof capability once the beverage container 300 is opened. This seal may be in the form of a separate piece of structure (such as a silicone ring or the like), while in another form it may be deposited onto the cup 100 or ring 200 as a coating.

As with the beverage container 300, the cup 100 defines a substantially axisymmetric profile about the axis of rotation $A_R$ and includes a cup closed upper surface 110 and a cup open lower surface 120. Similarly, the ring 200 defines a substantially axisymmetric profile about the axis of rotation $A_R$ and includes a ring upper surface 210 and a ring lower surface 220. Within the present disclosure, the terms "cup axis of rotation", "ring axis of rotation", "can axis of rotation" or the like may additionally be used to more particularly place such axis of rotation within the context of the part being described, and that such more particular description is meant to be used interchangeably with the axis of rotation $A_R$ depicted in FIG. 1 for situations where all three are axially aligned. Likewise, relative terms such as upper and lower when used to describe portions of the cup 100 and ring 200 are understood to correspond to situations where the beverage container 300 to which the tamper-resistant lid assembly 1 may be attached.

Sidewalls 130 provide vertical spacing between the closed upper surface 110 and the open lower surface 120 to define a volume V within the cup 100. In addition to providing a vessel into which a beverage or related fluid from the beverage container 300 may be poured, the additional structural rigidity provided by the sidewalls 130 give the cup 100 much more strength to provide enhanced gripability and stackability the latter for situations where numerous beverage container 300 are stacked on top of one another, such as for storage. In one form, the cup 100 may be made from easily-formable materials such as polypropylene, polyethylene or combinations thereof or related low-cost, non-toxic materials. As can be seen with particularity in FIGS. 1, 3 through 6 and 9, the closed upper surface 110 further comprises an upward projecting central plateau 115. The plateau 115 has sufficient rigidity and geometric repeatability to make it easy to vertically stack one or more of the beverage containers 300 in a nested way so long as at least a vertically lower one of the beverage containers 300 has the tamper-resistant lid assembly 1 secured thereto.

Figure 10:
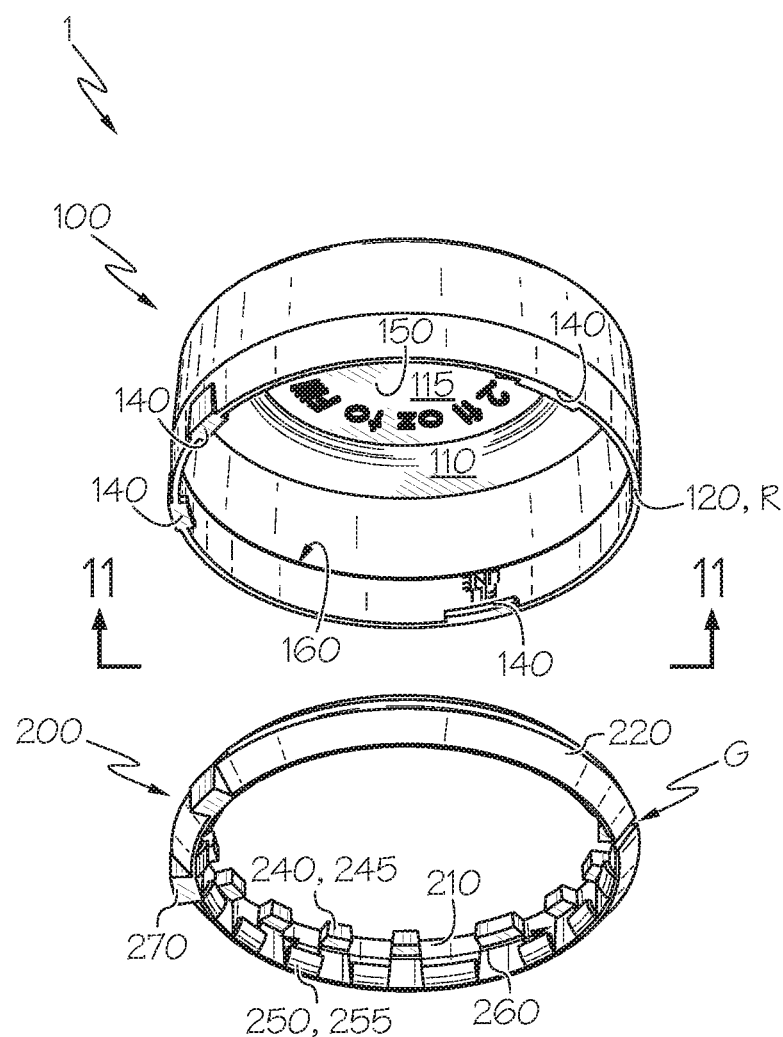
FIG. 10 is a lower perspective view of the tamper-resistant lid assembly of FIG. 9.
Figure 11:
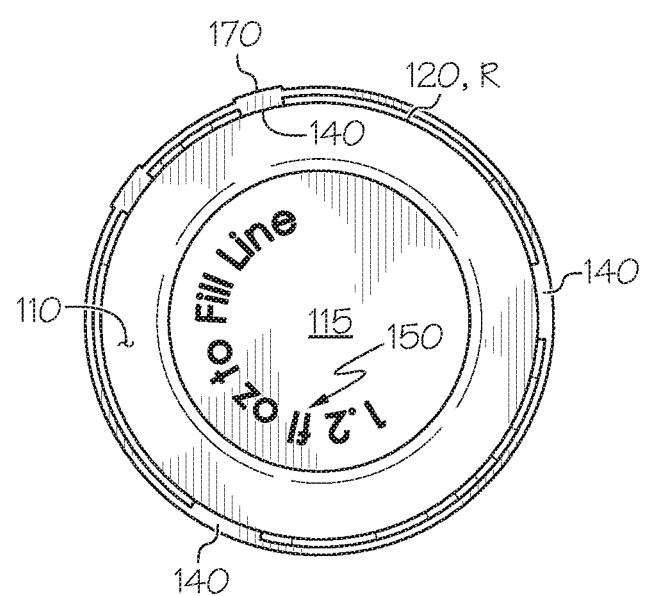
FIG. 11 is a bottom view of the cup of FIG. 9.

Referring with particularity to FIGS. 10 and 11 in conjunction with FIG. 1, the cup open lower surface 120 defines a peripheral rim R that includes numerous irregularly-spaced and radially inward-facing tabs 140. In this way, an additional deterrent to misapplying the ring 200 to the cup 100 is enabled. As can be seen, the volume V may further include indicia to allow a user to determine how much liquid has been poured into the cup 100; such indicia may include one or both of verbiage 150 setting forth the amount of liquid, as well as a fill line 160. The peripheral rim R that is formed along the cup open lower surface 120 has four radially inward-facing tabs 140 extending therefrom in an irregular (that is to say, uneven) spacing, while the exterior has one or more (presently shown as a pair of) cup alignment indicators 170. In this way, the radially inward-facing tabs 140 slidably fit within a radially-inward projecting trough 230 that will be discussed in more detail as follows.

Figure 9:
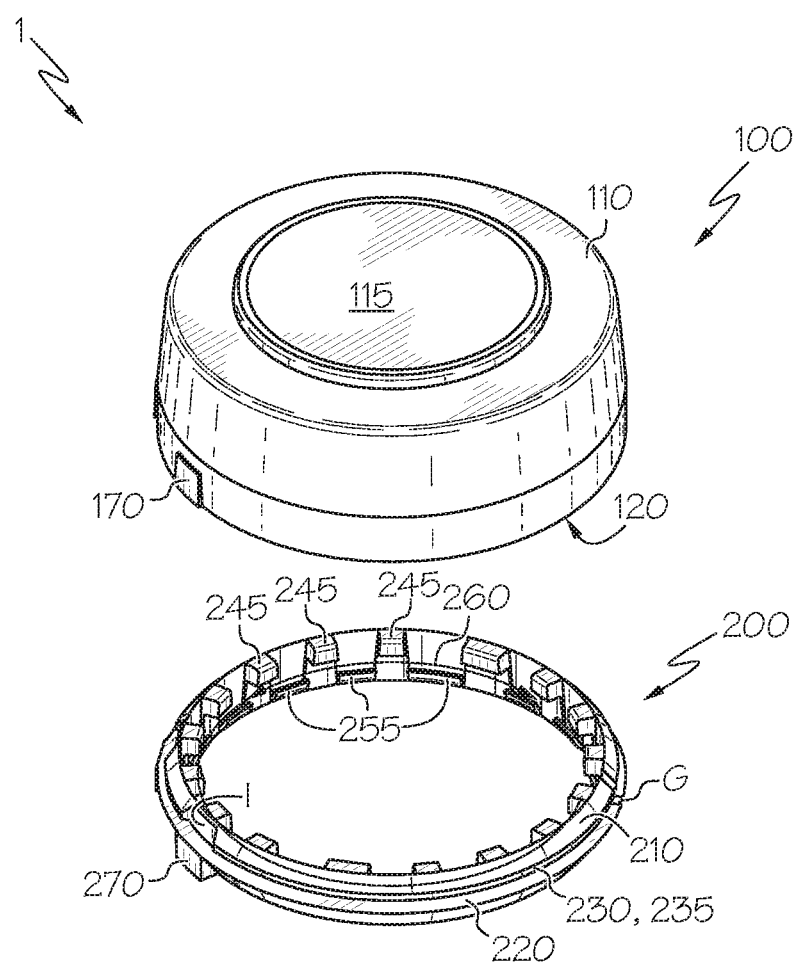
FIG. 9 is an upper perspective view of the tamper-resistant lid assembly for dispensing a premeasured amount of liquid according to the first embodiment of the present design, the tamper-resistant lid assembly presently shown in a disassembled state between the cup and the ring.

As with the cup 100, the ring 200 defines a substantially axisymmetric profile about its axis of rotation $A_R$. The ring 200 additionally includes an upper surface 210 that is sized and shaped to selectively engage the ring-engaging peripheral rim R of the cup open lower surface 120, as well as a lower surface 220 that is sized and shaped to selectively engage the lip L that is formed around the dispensing section 330 of the beverage container 300. A gap G formed in the ring 200 and that extends from the ring upper surface 210 to the ring lower surface 220 and entirely therethrough promotes an enhanced degree of ring 200 deformability, while the radially-inward projecting trough 230 is formed about a substantial external periphery between the ring upper surface 210 and ring lower surface 220 and may be used to selectively engage the numerous irregularly-spaced and radially inward-facing tabs 140 of the cup open lower surface 120. Moreover, one or more (presently shown as two) ring alignment indicators 270 situated on the external periphery between the ring upper surface 210 and ring lower surface 220 may selectively be placed in alignment or registration with the corresponding one of a comparable number of the cup alignment indicators 170 to provide indicia of whether (or whether not) the cup 100 and ring 200 are within registered alignment with one another. Likewise, FIG. 9 shows indents I that are formed within the various places around the circumference of the ring upper surface 210 in order to allow the tabs 140 of the cup open lower surface 120 to fit within up an axial compressing motion between the cup 100 and ring 200. The rotationally slidable cooperation of the radially inward-facing tabs 140 and the trough 230 is such that upon an axially-oriented snap-fit connection between the cup 100 and the ring 200 while the cup alignment indicators 170 and ring alignment indicators 270 are axially aligned, and subsequent relative twisting motion of the cup 100 to the ring 200, an offset is created between the indents I and the radially inward-facing tabs 140 such that the radially inward-facing tabs 140 cause the cup 100 to be locked in place with the ring 200. In this way, the combination of the snap-fit connection and the subsequent relative twisting movement forms a secure, lockable connection between the cup 100 and the ring 200.

Figure 8:
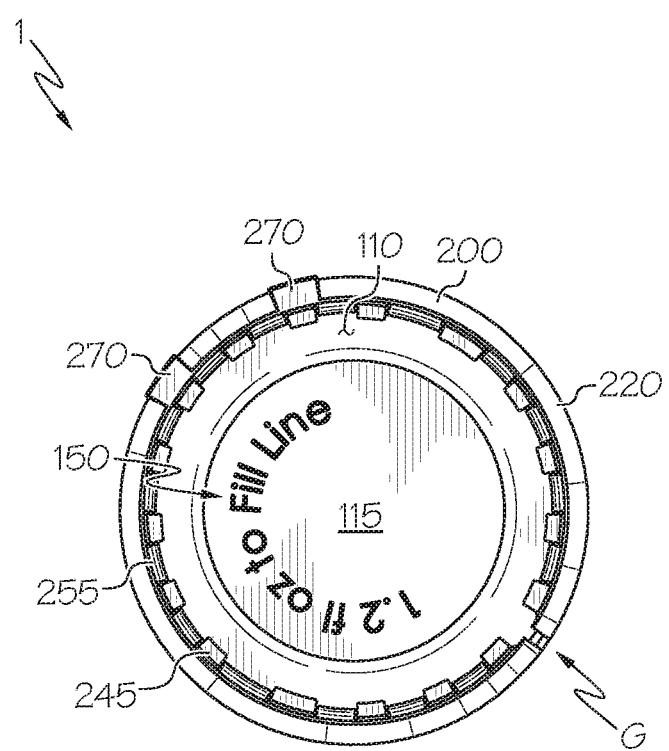
FIG. 8 is a bottom view of the tamper-resistant lid assembly of FIG. 1.
Figure 12:
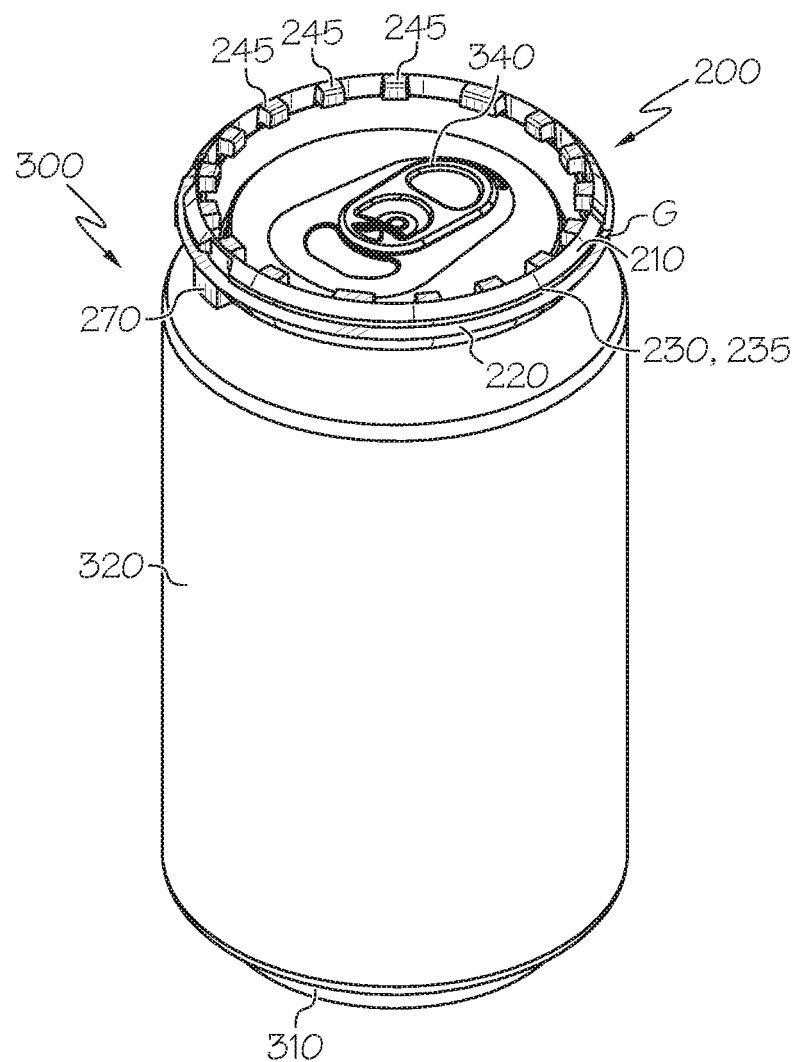
FIG. 12 is an upper perspective view of the ring portion of the tamper-resistant lid assembly secured to a beverage container.

Referring with particularity to FIGS. 2, and 8 through 10, two rows of teeth in the form of an upper row 240 and a lower row 250 are formed within the ring 200 such that numerous teeth 245, 255 corresponding to each of the rows 240, 250 extend radially inward from a respective one of the ring upper surface and ring lower surface. In one form such as can be seen in FIG. 8, the teeth 245, 255 give the ring 200 a generally castellated profile where the teeth 245 of the upper row 240 are offset relative to the such that the teeth 255 of the lower row 250 such that when viewed axially about the axis of rotation $A_R$ (such as shown with even more particularity in FIG. 8), the totality of the teeth 245, 255 give the general appearance of a substantially continuous radially-inward circumferential projection from the ring 200. As with the radially inward-facing tabs 140 of the cup open lower surface 120, the teeth 245, 255 of one or both of the rows extend radially-inward. Such construction allows the upper row 240 and lower row 250 and their corresponding teeth 245, 255 to form a secure connection with the lip L of the dispensing section 330 of the beverage container 300. Significantly, both sets of teeth 245, 255 are irregularly spaced from one another within their respective row 240, 250. In particular, a castellated appearance created by the upper row 240 of teeth 245 and the lower row 250 of teeth 255 when viewing the ring 200 helps show how the lower row 250 of teeth 255 grasp a lower-facing portion of the lip L of the dispensing section 330 of the beverage container 300, as shown in FIG. 12. Furthermore, the gap G promotes ring 200 removability, such as to facilitate better pouring. In addition, the gap G allows some measure of variability in the diameter of the lip L so that upon attachment, the ring 200 is neither too loose nor too tight. In addition, the castellated appearance created by the upper row 240 of teeth 245 shows how they grasp an upper-facing portion of the lip L of the dispensing section 330 of the beverage container 300 such that the ring 200 forms a secure fit with the beverage container 300 along the direction that coincides with their common axis of rotation $A_R$. Moreover, the radially-inward projection from the inner surface of the ring 200 of the two rows of teeth in the form of an upper row 240 and a lower row 250 define a lip-engaging trough 260 that functions to permit a snap-fit connection of the ring 200 to the lip L of the dispensing section 330 of the beverage container 300. As with the trough 230 that circumscribes the outer surface of the ring 200, the lip-engaging trough 260 that is on the inner surface of the ring 200 between the upper row 240 and a lower row 250 of teeth 245, 255 permits snap-fit engagement; unlike the trough 230, it defines a larger profile commensurate with the size of the lip L of the dispensing section 330 of the beverage container 300. Within the present disclosure, and outside of the previous discussion of one form of the totality of the teeth 245, 255 giving the general appearance of a substantially continuous radially-inward circumferential projection from the ring 200, the views depicting the pair of rows 240, 250 are not meant to necessarily require that their respective teeth 245, 255 are matched in number, size, shape, spacing or alignment in any way. In fact, in one particular form, teeth 245 differ in number, size and shape from teeth 255.

Referring with particularity to FIG. 9, the indents I formed within the ring upper surface 210 and the ring alignment indicators 270 formed within the ring lower surface 220, as well as the trough 230 formed between the ring upper surface 210 and the ring lower surface 220, cooperate with the tabs 140 and cup alignment indicators 170 formed within the cup lower surface 120 to provide the selective attachment of the cup 100 and ring 200 to one another, as well as the selective attachment of the tamper-resistant lid assembly 1 to the beverage container 300 such that the tamper-resistant lid assembly 1 acts as a securing mechanism after the dispensing section 330 of the beverage container 300 is open through the action of the stay-on tab 340. In this way, the interlocking features that are formed between the cup 100 and ring 200 by this cooperation of components are what gives the tamper-resistant lid assembly 1 its tamper-resistant qualities in that the cup 100 only comes off when the ring 200 and cup 100 are aligned properly with each other. The uppermost portion of the ring lower surface 220 defines a slightly larger circumference such that a ledge 235 forms a seating area for the rim R of the cup lower surface 120. In this way, when the cup 100 and ring 200 are secured to one another to form the tamper-resistant lid assembly 1, the ring upper surface 210 may fit concentrically within the cup 100 so that it is adjacent an inner surface of the cup 100 and substantially hidden from sight when the tamper-resistant lid assembly 1 is viewed from above.

The ring 200 and cup 100 are cooperative with one another and the beverage container 300 such that upon a registered snap-fit connection of the cup open lower surface 110 and the ring upper surface 210 along their respective axes of rotation $A_R$, the ring 200 and cup 100 form the assembly as a unitary whole that upon a subsequent snap-fit connection to the lip L of the beverage container 300 through the ring lower surface 220 substantially inhibits access to the liquid that is situated within the beverage container 300. In this way, the assembly is replaceable and can also be used to measure out a precise amount of the beverage from the container 300. In one form, a similarly premeasured amount of additive may be placed within the cup 100.

In one form, the various features—such as the tabs 140, verbiage 150, fill line 160, and cup alignment indicators 170 shown in the cup 100 may be integrally formed, such as by molding processes known in the art.

Referring with particularity to FIG. 9 in conjunction with FIG. 10, within the present disclosure, it is understood that while many different ring configurations may have some degree of deformability—such as due to one or both of relative thinness of profile or relatively low modulus of elasticity material attributes—the ring 200 of the present disclosure (and to the extent that it too may possess one or both of these attributes as well) attains an enhanced degree of deformable attributes by virtue of the break in continuity that arises from the gap G. In one form, the gap G promotes removability of the ring 200 such as for situations where a user wants to take a drink from the cup 100, as well as when the user wants to pour from the beverage container 300 without having the liquid dribble out. Such construction avoids having liquid dribble between the ring 200 and cup 100. Furthermore, the gap G allows the ring 200 to change from a substantially planar, two-dimensional profile to a spiral-like three-dimensional profile. In particular, the substantially planar profile of the ring 200 in its undeformed state may be envisioned when the ring 200 is placed onto a smooth planar surface (for example, a table top) upon such that a substantial entirety of the upper or lower surface 210, 220 contacts the surface upon which the ring 200 is placed, while in its deformed state is such that the more spiral-like shape prohibits a substantial majority of the upper or lower surface 210, 220 from contacting with the smooth planar surface upon which the ring 200 is placed. In other words, the gap G creates a weakening in the ring 200, which in turn allows a measure of flexural deformation of the ring 200 such that the ends formed by the discontinuity created by gap G are facingly adjacently in an undeformed state but can be made to separate in a deformed state such that the ends both move away from one another within the plane defined by the ring 200 as well as out-of-plane along the axis of rotation $A_R$. Likewise, within the present disclosure, the terms "registration", "registered snap-fit connection", "registered alignment" and their variants means that the respective alignment indicators on the cup and ring are aligned with one another along the axial direction that is formed by the axis of rotation $A_R$ so that upon forcing them toward one another along their respective axis of rotation $A_R$, a resilient snap-fit connection is formed, as well as the ability of a user to relatively easily pry apart the cup and ring in situations where the two are sought to be disassembled. Contrarily, misalignment between the respective alignment indicators 170, 270 indicates either a locked condition (once the snap-fit engagement between the cup 100 and ring 200 is established and the ring 200 and cup 100 are subsequently rotationally twisted relative to one another) or a configuration where the formation of such a snap-fit connection is not favorable (prior to forming such snap-fit engagement) Likewise, when the alignment indicators 170, 270 of each of the cup 100 and ring 200 are not axially aligned with one another, they are deemed to be out of registration with one another such that if the state of being out of registration takes place while the ring 200 and cup 100 are in their assembled state, the cup 100 and ring 200 are deemed to be in a locked condition, whereas if the state of being out of registration takes place while the ring 200 and cup 100 are in their disassembled state, the ability to form the cup 100 and ring 200 into the tamper-resistant lid assembly 1 is either significantly hampered or rendered impossible without imposing significant structural damage to one or both of the ring 200 and cup 100. Furthermore, within the present disclosure, the term "irregularly spaced" does not necessarily require that the elements being described are randomly spaced, but merely that not all of such elements are even-spaced around the periphery of the corresponding rind or rim.

Referring next to FIGS. 9 and 10, details associated with the ring 200 are shown with more particularity. The ring 200 further has its ring upper surface 210 and ring lower surface 220 axially separated by a radially-inward projecting trough 230 that extends substantially around the circumference of the ring 200. The ring upper surface 210 is sized and shaped to selectively engage the ring-engaging peripheral rim R of the cup open lower surface 120. As shown with particularity in FIG. 9, the ring upper surface 210 has a slightly smaller circumferential profile than the ring lower surface 220. In this way, the ledge 235 is formed by the trough 230 and is wide enough to allow a resting or contact surface for the open lower surface 120 of cup 100. In one form, both of the ring upper surface 210 and the ring lower surface 220 may define angled outward projections in the form of tapered connectors as shown; these may include smooth sides to make the cup 100 hard for children to grasp.

In one form, a method of securing the tamper-resistant lid assembly 1 to the beverage container 300 may include providing a cup 100 and a ring 200 each of which is sized to form an interference fit with one another, while the ring 200 is sized to fit with the lip L that is situated on the dispensing section 330 of the beverage container 300. As previously stated, in one form, the ring 200 may be secured to the beverage container 300 either with (as part of the tamper-resistant lid assembly 1) or without (as a standalone component, such as depicted in FIG. 12) the cup 100. In this latter form, leaving the ring 200 in place facilitates ease of replacement of the cup 100 for future use. It will likewise be appreciated that there are situations where precise order of connection between the ring 200, cup 100 and lip L of the beverage container 300 is not critical. As such, in one form, the snap-fit connection is formed between the ring 200 and the lip L is made with the cup 100 being secured to the ring 200. In another form, the snap-fit connection is formed between the ring 200 and the lip L without the cup 100 first being secured to the ring 200.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present context, if a claim recites that at least one of the teeth within each row are not of the same in at least one of number, size and shape as the others within each row, and if such teeth differ in number alone, size alone, shape alone or two or more of number, size and shape, then such difference satisfies the claim.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It is further noted that terms like "preferably," "commonly," and "typically," when utilized herein, are not utilized to limit the scope of the claimed present disclosure or to imply that certain features are critical, essential, or even important to the structure or function of the claimed present disclosure. Rather, these terms are merely intended to identify particular aspects of an embodiment of the present disclosure or to emphasize alternative or additional features that may or may not be utilized in a particular embodiment of the present disclosure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tamper-resistant lid assembly for dispensing a premeasured amount of liquid from a beverage container, the assembly comprising:
   a cup sized and shaped to receive a premeasured amount of liquid that is being dispensed from the beverage container, the cup defining a substantially axisymmetric profile about a cup axis of rotation and comprising:
      a cup closed upper surface formed at a first cup location along the dimension that is formed by the cup axis of rotation;
      a cup open lower surface formed at a second cup location along the dimension that is formed by the cup axis of rotation that is spaced from the first cup location to define a volume within the cup, the cup open lower surface defining a ring-engaging peripheral rim with a plurality of irregularly-spaced and radially inward-facing tabs extending therefrom, the cooperation of the cup closed upper surface and the cup open lower surface being such that a cup inner surface defined by the volume forms a cup suitable for containing the premeasured amount of liquid while a cup outer surface forms a grasping region of the cup; and
      at least one cup alignment indicator situated on the cup outer surface; and
   a ring defining a substantially axisymmetric profile about a ring axis of rotation and comprising:
      a ring upper surface sized and shaped to selectively engage the ring-engaging peripheral rim of the cup open lower surface;

a ring lower surface sized and shaped to selectively engage the lip that is formed around the dispensing end of the beverage container;

a radially-inward projecting trough formed about a substantial external periphery between the ring upper surface and ring lower surface to selectively engage the plurality of irregularly-spaced and radially inward-facing tabs of the cup lower surface;

at least one ring alignment indicator situated about the substantial external periphery between the ring upper surface and ring lower surface to provide indicia of whether or not the cup and ring are within registered alignment with one another; and a pair of rows of teeth such that the teeth of each of the pair of rows extend radially inward from a respective one of the ring upper surface and ring lower surface, the teeth of at least one of the pair of rows being irregularly spaced from one another within their respective row, wherein the ring and cup are cooperative with one another and the beverage container such that upon a registered snap-fit connection of the cup lower surface and the ring upper surface along their respective axes of rotation, the ring and cup form the assembly as a unitary whole that upon a snap-fit connection to the lip of the beverage container through the ring lower surface substantially inhibits access to the liquid that is situated within the beverage container.

2. The tamper-resistant lid assembly of claim 1, wherein the at least one cup alignment indicator is radially aligned with a corresponding one of the plurality of irregularly-spaced and radially inward-facing tabs.

3. The tamper-resistant lid assembly of claim 1, wherein at least one of the teeth within each row are not of the same in at least one of number, size and shape as the others within each row.

4. The tamper-resistant lid assembly of claim 1, wherein the teeth of one of the pair of rows are not the same in at least one of number, size and shape as the teeth of the other of the pair of rows.

5. The tamper-resistant lid assembly of claim 1, wherein the ring upper surface and ring lower surface each define a tapered connection to promote ease of the snap-fit connection with a respective one of the cup open lower surface and the lip that is formed around the dispensing end of the beverage container.

6. The tamper-resistant lid assembly of claim 1, wherein the at least one ring alignment indicator is situated about the substantial external periphery between the ring upper surface and ring lower surface and projects radially outward from the substantial external periphery of the ring lower surface.

7. The tamper-resistant lid assembly of claim 1, wherein the plurality of alignment indicators define a shape that projects radially-outward from the cup outer surface.

8. The tamper-resistant lid assembly of claim 1, wherein at least one of the pair of rows of teeth define a castellated appearance on the ring.

9. The tamper-resistant lid assembly of claim 1, wherein the cup closed upper surface further comprises an upward projecting central plateau configured to permit vertical stacking of a plurality of the beverage containers where at least a vertically lower one of the beverage containers has the tamper-resistant lid assembly secured thereto.

10. The tamper-resistant lid assembly of claim 1, further comprising a seal disposed between the ring and the cup.

11. The tamper-resistant lid assembly of claim 1, wherein the ring comprises enhanced deformability by virtue of a gap formed therein that extends from the ring upper surface to the ring lower surface and entirely therethrough.

12. The tamper-resistant lid assembly of claim 1, wherein the at least one ring alignment indicator comprises a plurality of ring alignment indicator and the at least one cup alignment indicator comprises a plurality of cup alignment indicators.

13. A method of providing a tamper-resistant lid assembly for use in dispensing a premeasured amount of liquid from a beverage container, the method comprising:

arranging the tamper-resistant lid assembly to comprise:
a cup suitable for containing the premeasured amount of liquid, the cup sized and shaped to receive a premeasured amount of liquid therein, the cup comprising a cup closed upper surface, a cup open lower surface, a cup inner surface, a cup outer surface and at least one cup alignment indicator situated on the cup outer surface; and a ring comprising a ring upper surface sized and shaped to selectively engage the cup open lower surface, a ring lower surface sized and shaped to selectively engage a lip that is formed around a dispensing end of the beverage container, a radially-inward projecting trough formed about a substantial external periphery between the ring upper surface and ring lower surface, at least one ring alignment indicator situated about the substantial external periphery between the ring upper surface and ring lower surface, and a pair of rows of teeth such that the teeth of each of the pair of rows extend radially inward from a respective one of the ring upper surface and ring lower surface, the teeth of at least one of the pair of rows being irregularly spaced from one another within their respective row;

configuring the at least one cup alignment indicator to be alignable with a corresponding one of the at least one ring alignment indicator to provide indicia of registered alignment of the cup and ring with one another;

configuring the ring and cup to be snap-fit secured to one another to through the radially-inward projecting trough upon the application of an axially compressive force between them once the indicia of registered alignment of the cup and ring with one another has been established; and configuring the assembly that is formed by the snap-fit engagement between the ring and the cup to be placeable onto a lip of the beverage container such that upon such snap-fit engagement of the tamper-resistant lid assembly onto the lip of the beverage container by a user, a secure connection is formed therebetween that substantially inhibits access to the liquid that is situated within the beverage container.

14. The method of claim 13, wherein the ring and the cup are configured to be snap-fit secured to one another prior to having the assembly be snap-fit secured to the beverage container.

15. The method of claim 13, wherein the ring and the cup are configured to be snap-fit secured to one another after having the assembly be snap-fit secured to the beverage container.

16. The method of claim 13, wherein the cup open lower surface defines a ring-engaging peripheral rim with a plurality of irregularly-spaced and radially inward-facing tabs extending therefrom while the ring upper surface defines a plurality of indents formed therein to accept the plurality of irregularly-spaced and radially inward-facing tabs upon the registered alignment of the cup and ring with one another.

17. The method of claim 13, further comprising configuring the ring to be deformable through the inclusion of a gap formed therein.

\* \* \* \* \*

UNITED STATES PATENT AND TRADEMARK OFFICE
CERTIFICATE OF CORRECTION

| | |
|---|---|
| PATENT NO. | : 11,326,923 B2 |
| APPLICATION NO. | : 16/596099 |
| DATED | : May 10, 2022 |
| INVENTOR(S) | : Benjamin Woolery |

It is certified that error appears in the above-identified patent and that said Letters Patent is hereby corrected as shown below:

In the Specification

In Column 7, Line 08, before "Like" insert --.--.

Signed and Sealed this
Sixteenth Day of August, 2022

Katherine Kelly Vidal
*Director of the United States Patent and Trademark Office*